Nov. 17, 1970 T. CAVANAUGH ET AL 3,541,345
PULSE GENERATING CIRCUIT
Filed Dec. 11, 1967

INVENTOR.
THOMAS CAVANAUGH
WILLIAM J. TUTEN
BY Charles M. Hogan
Gary M. Gron
ATTORNEYS United States Patent Office 3,541,345
Patented Nov. 17, 1970

3,541,345

PULSE GENERATING CIRCUIT

Thomas Cavanaugh and William J. Tuten, Richmond, Ind., assignors to Avco Corporation, Richmond, Ind., a corporation of Delaware Filed Dec. 11, 1967, Ser. No. 689,483
Int. Cl. H03k 3/45
U.S. Cl. 307—88 1 Claim

ABSTRACT OF THE DISCLOSURE

The disclosure illustrates a relatively simple circuit adapted to generate a single output pulse in response to a steady D.C. or recurrent D.C. pulses. The signal is received by a series-disposed current-limiting device, such as a capacitor and a reactor which are coupled to the primary of an output transformer. The reactor initially offers a high impedance to current flow and after saturation of its core provides a relatively low impedance to current flow. The current-limiting device initially offers a low impedance but after saturation provides a relatively high counter-electromotive force so that a single substantial current transient passes through the transformer primary. This produces a single electrical pulse across the secondary winding of the output transformer. A control winding for the reactor is supplied with a variable D.C. voltage to vary the saturation point of the reactor and vary the amount of electrical energy required to cause a pulse to be generated.

The present invention relates to pulse-generating circuits and more specifically to circuits of the type that generate a single output pulse in response to a steady electrical input signal or one which may be recurrent in nature.

Circuits of the above type may be employed for monitoring or actuating control of remote equipment. Frequently the circuits tend to be complicated and susceptible to damage when exposed to certain types of adverse environments, e.g., high temperature, vibration, etc.

Accordingly, it is an object of the present invention to provide a simplified, economical, rugged and reliable circuit for producing a single output pulse in response to a given input signal.

The above ends are achieved by providing an inductance including a core which initially offers a high impedance to applied current but upon saturation provides a relatively low impedance to continued current flow. A current-limiting means, comprising a capacitor or other current-limiting device, forms in series combination with the inductance a network adapted to conduct an electrical input signal. The current-limiting means initially presents a low impedance to current flow relative to that of the inductnace but after saturation of the inductance the capacitor will be charged at a rapid rate and present a relatively high counter-electromotive force to the current flow so that the inductance upon saturation passes only a single, relatively large, current transient. A transformer means has a primary coupled to the output of the inductance and also has a secondary so that an electrical pulse is produced at the secondary in response to the current transient from the inductance.

The above and other related objects and features of the present invention will be apparent from a reading of the description of the disclosure found in the accompanying drawings and the novelty thereof pointed out in the appended claims.

Figure 1:
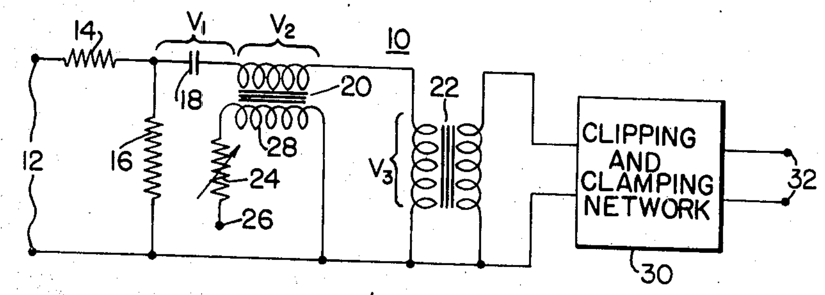
FIG. 1 is a circuit schematic of one form of a pulse-generating circuit embodying the present invention.
Figure 2:
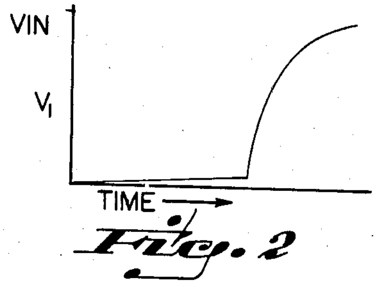
FIGS. 2, 3, 4 and 5 illustrate voltage and current changes which occur during the operation of the pulse-generating circuit of FIG. 1.

Reference is had to FIG. 1 which shows the pulse-generating circuit 10 having input terminals 12 which are adapted to receive a D.C. or recurrent pulse input signal of at least a given minimum level. A series resistor 14, shunt resistor 16, series capacitor 18, series reactor 20 and the shunted primary of a transformer 22, form a signal receiving network. A variable resistor 24, connected to a suitable D.C. source at terminal 26, is serially connected to a control winding 28 of the reactor 20. The secondary of the transformer 22 is connected to a clipping and clamping network 30 or one of any well-known type of network used to produce a given shaped pulse at output terminals 32.

Figure 4:
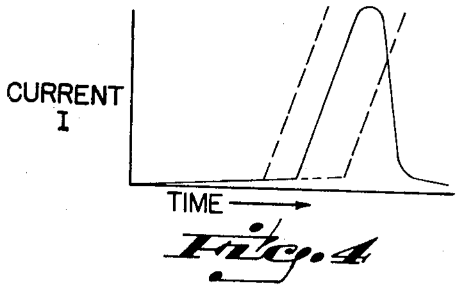
Figure 3:
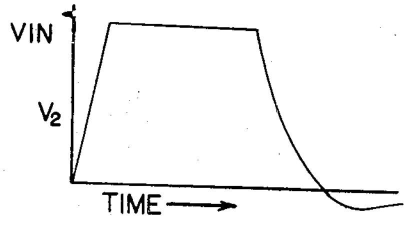
Figure 5:
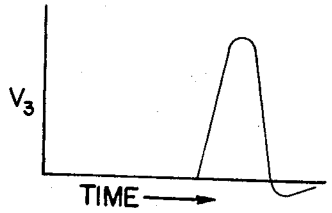

With reference to FIGS. 2, 3, 4 and 5, the initial application of a D.C. input signal to terminals 12 at time $t=0$ causes a negligible voltage drop (FIG. 2) across the capacitor 18 because it is in a discharged state. At the same time the serially connected reactor 20 initially offers a substantial impedance to current flow therethrough, thus causing a substantial voltage drop (FIG. 2) thereacross. As time elapses, current (FIG. 4) builds up to a point where the core of the reactor becomes magnetically saturated and its impedance drops to an extremely low value causing a substantial increase in current flow. As seen in FIG. 3, the voltage drop across the reactor 20 then decreases substantially. At this time the characteristics of the capacitor 18 are such that it now offers a relatively high counter-electromotive force to current flow causing the voltage drop thereacross to increase, as seen in FIG. 3. In other words, the accumulation of a charge on the capacitor 18 in effect presents an increasing obstruction to current flow through the reactor 20. As a result, an extremely high current transient is passed through the reactor 20 and through the primary of the serially onnected transformer 22 (FIG. 5). The rapid current transient in the primary of the transformer 22 causes a single voltage pulse to be generated in the secondary of the transformer which is processed by the clipping and clamping network 30, illustrated herein, to eliminate the negative portion of the pulse and limit its amplitude.

It should be noted particularly in FIG. 4 that the saturation of the reactor 20 takes place after a predetermined level of current flows from the D.C. source. Therefore an electrical pulse is generated only in response to electrical signals above a predetermined energy level. Thus, electrical signals that are too low in voltage or too short in duration will not cause the reactor core to saturate. This predetermined level or threshold may be selected by the design of the reactor 20 or it may be varied by applying a positive or negative magnetic bias to the core of the reactor 20 thereby varying the current required to drive the reactor 20 to saturation and resulting in minimum reactor impedance, as shown by the phantom lines of FIG. 4. As herein shown, this is accomplished by means of a D.C. current through the control winding 28. It should be noted that while the circuit described produces an electrical pulse in response to an input signal above a certain energy level, it may also be used with a given signal input to produce an output pulse having a predetermined delay. As shown in FIG. 4, the time at which the core saturates and the electrical pulse is generated, varies with the magnetic threshold level selected. The D.C. current through the control winding 28 may then be varied to produce an output pulse at a given time after the application of an input signal of sufficient magnitude to always saturate the reactor 20.

The circuit of FIG. 1 is capable of repeated use by means of the shunted resistor 16 which is used to slowly discharge the capacitor 18 when the D.C. signal is terminated at the input terminals 12. After the capacitor 18 is discharged the circuit is again ready to receive a D.C. input signal for generation of a single electrical pulse.

Figure 6:
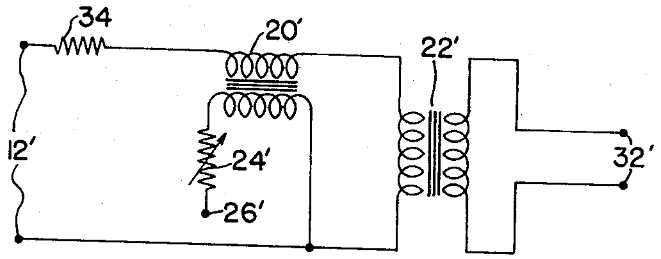
FIG. 6 is a circuit schematic of another form of a pulse-generating circuit embodying the present invention.

While the circuit shown in FIG. 1 is quite simple and provides a rugged compact circuit for reliable generation of an electrical pulse, the circuit in FIG. 6 enables the use of the pulse-generating circuit under extremely adverse environments, e.g., high temperature, vibration, etc. In the circuit the series resistor 14 and series capacitor 18 are replaced by a series resistor 34 which, together with the series reactor 20', shunted primary of the transformer 22' and the shunted resistor 16', form a signal receiving network from terminals 12'. In this circuit the resistor 34 is sized so that upon initial application of a D.C. input signal to terminals 12', sufficient current flows through the primary of the reactor 20' to enable saturation thereof and generation of a substantial current transient. However, the resistor 34 is sized to have a power capacity that causes it to burn out after the current flow through the reactor 20' has reached a predetermined maximum, which is generally less than that required to burn out the windings of the reactor 20'. Because of the saturation of the core of the reactor 20' a substantial current transient is generated through the primary of the transformer 22', thereby causing a substantial electrical output pulse to be generated across the secondary of the transformer. This pulse may be applied directly to the output terminals 32'. It should be noted that the saturation point of the reactor 20' may be varied as in the circuit of FIG. 1 by varying the D.C. bias on the control windings 28' to provide a variable threshold for generation of the electrical pulse.

While the preferred embodiments of the present invention have been illustrated, it should be apparent to those skilled in the art that other circuits may be employed to achieve equivalent results without departing from the spirit and scope of the present invention.

Having thus described the invention, what is claimed as novel and desired to be secured by Letters Patent of the United States is:

1. A pulse-generating circuit comprising:

an inductance including a core, said core initially offering a high impedance to applied current and after an elapsed time interval saturates to provide a relatively low impedance to continued current flow, current-limiting means forming in series combination with said inductance a network adapted to receive an electrical input signal, said current-limting means initially presenting a low counter-electromotive force to current flow relative to that of said inductance but after saturation of said inductance presenting a relatively high counter-electromotive force to said current whereby said inductance, on saturation after said elapsed time interval, passes a single relatively large current transient, and transformer means having a primary series coupled to the output of said inductance and also having a secondary so that an electrical pulse is produced at said secondary in response to the current transient from said inductance, said current-limiting means comprises:

a resistor connected in series with said inductance, said resistor permitting sufficient current flow through said inductor for saturation and having a predetermined maximum power capacity below the current flow for saturation of said core for terminating current flow after saturation.

References Cited

UNITED STATES PATENTS

| | | | |
|---|---|---|---|
| 2,758,221 | 8/1956 | Williams | 307—88 |
| 3,041,467 | 6/1962 | Averbach | 307—88 |
| 3,121,800 | 2/1964 | Daykin | 307—88 |
| 2,727,160 | 12/1955 | Sunderlin | 307—106 |
| 3,163,771 | 12/1964 | Paulsen et al. | 307—88 |

STANLEY M. URYNOWICZ, Jr., Primary Examiner

U.S. Cl. X.R.

307—106